United States Patent
Eloundou et al.

(10) Patent No.: US 6,920,378 B2
(45) Date of Patent: Jul. 19, 2005

(54) COMMAND GENERATION COMBINING INPUT SHAPING AND SMOOTH BASELINE FUNCTIONS

(75) Inventors: Raynald F. Eloundou, Jackson, MI (US); William E. Singhose, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 181 days.

(21) Appl. No.: 10/389,055

(22) Filed: Mar. 13, 2003

(65) Prior Publication Data

US 2003/0218440 A1 Nov. 27, 2003

Related U.S. Application Data

(60) Provisional application No. 60/364,159, filed on Mar. 13, 2002.

(51) Int. Cl.[7] ............................................... G05B 13/02
(52) U.S. Cl. ........................... 700/280; 700/28; 700/55; 700/71
(58) Field of Search ............................. 700/28, 32, 35, 700/54, 55, 71, 275, 280; 82/163

(56) References Cited

U.S. PATENT DOCUMENTS

| | | | | |
|---|---|---|---|---|
| 3,967,176 A | * | 6/1976 | Wagener et al. | 318/603 |
| 4,849,900 A | | 7/1989 | Blight | 701/7 |
| 4,916,635 A | | 4/1990 | Singer et al. | 700/254 |
| 5,359,520 A | * | 10/1994 | Aubrun et al. | 700/44 |
| 5,452,594 A | * | 9/1995 | Kim et al. | 68/3 SS |
| 5,638,267 A | | 6/1997 | Singhose et al. | 700/28 |
| 6,002,232 A | | 12/1999 | McConnell | 318/629 |
| 6,102,221 A | | 8/2000 | Habisohn | 212/270 |
| 6,314,473 B1 | * | 11/2001 | Singer et al. | 710/5 |
| 6,505,085 B1 | | 1/2003 | Tuttle | 700/28 |
| 6,608,275 B1 | * | 8/2003 | Nakagawa et al. | 219/69.16 |
| 6,801,010 B2 | * | 10/2004 | Zhang et al. | 318/611 |

OTHER PUBLICATIONS

Filtering Technique Combining Input–Shaping and Smooth Reference Commands for Residual Vibrations Reduction in Computer–Controlled Machines. by Raynald Eloundou and William Singhose, no date.
Posicast Control of Damped Oscillatory Systems by Otto J.M. Smith—Proceedings of the IRE Sep. 1957 pp. 1249–1255.
Justification For Using Step–Function Reference Commands: Comparison to S–Curve—by Raynald Eloundou and William Singhose—2nd IFAC Conference on Mechatronic Systems, Berkley, Ca. 2002.
Interpretation of Smooth Reference Commands As Input–Shaped Functions by Raynald Eloundou and William Singhose—ACC02–ASME1110, no date.
Investgation of Various Reference Commands for Vibration Reduction: A Thesis Presented to The Academic Faculty by Raynald Fabrice Eloundou—Jul., 2002.

* cited by examiner

*Primary Examiner*—Paul Rodriguez
(74) *Attorney, Agent, or Firm*—Thomas, Kayden, Horstemeyer & Risley

(57) ABSTRACT

One preferred embodiment of the invention provides systems and methods for controlling a physical system by generating an input to the physical system that does not excite unwanted dynamics. Briefly described, one embodiment of the system among others, can be broadly summarized by as follows. A control entity generates a desired motion command for a physical system. A command generator then produces a shaped-smooth reference command for the physical system from the desired motion command that will cause the physical system to move in the desired motion without unwanted dynamics. Methods and other systems are also provided.

34 Claims, 9 Drawing Sheets

```
┌─────────────────────────────────────────────────┐
│  IDENTIFY IMPORTANT CHARACTERISTICS OF MECHANICAL│
│                    SYSTEM                        │
│                                          1010    │
└─────────────────────────────────────────────────┘
                        │
                        ▼
┌─────────────────────────────────────────────────┐
│  GENERATE FAST RISING SMOOTH BASELINE REFERENCE │
│  COMMAND FOR SUPPRESSING VIBRATION AT HIGH MODES│
│                                          1020   │
└─────────────────────────────────────────────────┘
                        │
                        ▼
┌─────────────────────────────────────────────────┐
│     GENERATE REFERENCE COMMAND BY CONVOLVING    │
│  BASELINE REFERENCE COMMAND WITH INPUT SHAPER   │
│     THAT SUPPRESSES VIBRATION AT LOW MODES      │
│                                          1030   │
└─────────────────────────────────────────────────┘
                        │
                        ▼
┌─────────────────────────────────────────────────┐
│      DELIVER REFERENCE COMMAND TO MECHANICAL SYSTEM│
│                                          1040   │
└─────────────────────────────────────────────────┘
```

FIG. 10

COMMAND GENERATION COMBINING INPUT SHAPING AND SMOOTH BASELINE FUNCTIONS

CROSS-REFERENCE TO RELATED APPLICATION

This application claims priority to U.S. provisional application entitled, "Command Generation Technique Combining Input-Shaping and Smooth Functions for Residual Vibrations Reduction in Computer-Controlled Machines," having Ser. No. 60/364,159, filed Mar. 13, 2002, which is entirely incorporated herein by reference.

TECHNICAL FIELD

The present invention is generally related to mechanical systems and, more particularly, is related to a system and method for reducing vibrations in mechanical systems.

BACKGROUND OF THE INVENTION

Unwanted vibration is a major problem that affects the performance of many flexible mechanical systems. For example, when a flexible mechanical system is moved it has a tendency to vibrate. These vibrations can cause problems for the operator of the system. This vibration can cause damage to the system or surroundings or lower productivity by forcing the system to be moved slowly. Therefore it is advantageous to reduce the level of vibration caused when these structures are moved. Such mechanical systems include coordinate measuring machines, wafer steppers, wafer handling robots, drilling machines, disk head testers, hard disk drives, and robotic arms utilized in space. For example, robotic arms, construction cranes, and satellite positioning systems are often limited in their speed and accuracy by vibration.

In control systems, the commands used to perform a desired motion can have a variety of shapes, and the shapes of these commands can greatly affect system performance. In the field of command generation for reducing mechanical vibrations, two fundamentally different techniques have often been opposed for achieving fast motions with minimum vibration: command smoothing and input shaping.

Command smoothing is a type of command generation that consists of creating "smooth" profiles to move systems with compliance. The intuitive concept behind these commands is that a flexible system should be progressively accelerated to a maximum speed and then gradually decelerated when approaching the desired setpoint so as to minimize motion-induced vibrations. This technique counts on smooth transitions between critical points of the trajectory to avoid exciting the flexible modes of the system. This smoothness is obtained via solving a set of boundary conditions in velocity, acceleration, jerk, etc. Examples of smooth commands include S-curves, versines, and trigonometric functions.

Another solution for reducing vibrations is called command shaping.

Command shaping attempts to negate any vibration induced by the reference command to the system by judiciously superimposing a delayed and scaled version of the command. Command shaping is not concerned with the "smoothness" of the reference command. Instead, the choice of the delayed and scaled command components depends on the known properties of the system such as natural frequency and damping ratio. Input shaping, a specific subset of command shaping, is implemented by convolving a sequence of impulses, an input shaper, with any desired motion command to produce a reference command. By modifying the desired command in this way, the input shaper acts to cancel the vibration induced by the desired command.

Distinction has been made between command shaping and smooth command profiles on the basis of their shape and the system's response. In most cases, the smooth profiles have the effect of a low-pass filter while command shaping could be considered as notch filtering superimposed on whatever effect the reference command produces. Unlike command shaping, smooth commands usually fail to fully exploit the known properties of the system such as natural frequency and damping ratio.

These techniques generally work well on reducing residual vibrations in mechanical systems that predominately vibrate at one or two particular modes or frequencies. However, another important class of vibratory systems has one or two dominant low modes and a range of high frequencies. While S-curves, for example, suppress high frequency vibrations due to their low pass filter qualities, the rise time duration of the S-curve is a drawback, since it typically is several times longer than that of a corresponding shaped command. Input shaping can be used for high-mode limiting (HML) but requires extensive computation and is not very robust for unmodeled high modes.

Therefore, a robust and timely solution is desired for reducing vibrations for the class of vibratory systems featuring a wide range of unmodeled high modes.

Ideally, the optimal solution would be to develop fast-rising low-pass filtering commands that could both suppress low modes and ensure unmodeled high modes do not degrade the system positioning. Thus, a heretofore unaddressed need exists in the industry to address the aforementioned deficiencies and inadequacies.

SUMMARY OF THE INVENTION

Preferred embodiments of the invention provide systems and methods for controlling a physical system by generating an input to the physical system that does not excite unwanted dynamics. Briefly described, in architecture, one embodiment of the system, among others, can be implemented as follows. A control entity generates a desired motion command for a physical system. A command generator then produces a shaped-smooth reference command for the physical system from the desired motion command that will cause the physical system to move in the desired motion without unwanted dynamics.

The present invention can also be viewed as providing methods for controlling a physical system without exciting unwanted dynamics. In this regard, one embodiment of such a method, among others, can be broadly summarized by the following steps: receiving a motion command for the physical system; and generating from the motion command a shaped-smooth reference command for the physical system that causes the physical system to move according to the motion command while minimizing unwanted dynamics in the physical system.

Other systems, methods, features, and advantages of the present invention will be or become apparent to one with skill in the art upon examination of the following drawings and detailed description. It is intended that all such additional systems, methods, features, and advantages be included within this description and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 10 is a flow chart describing the functionality of a preferred implementation of the control system of FIG. 1A.

DETAILED DESCRIPTION OF THE PREFERRED EMBODIMENTS

The performance of mechanical systems depends on numerous variables such as the mechanical design, the operating environment, and the control system. The most important influence on performance varies from system to system and may change over time, or with the task being performed. However, the control system is almost always an important factor in system performance. Given the increasing use of computers to control mechanical systems and the trend toward faster, lighter, and more flexible structures, control system design and implementation will continue to gain in importance. The control system must perform functions such as positioning, trajectory tracking, suppression of residual vibration, obstacle avoidance, and disturbance rejection.

Figure 1A:
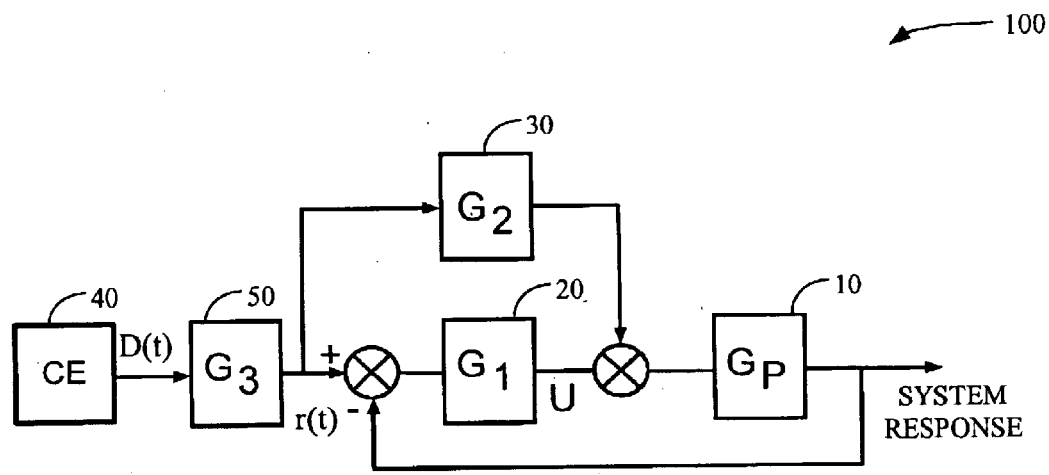
FIG. 1A is a block diagram of a control system of one embodiment of the present invention.

FIG. 1A shows a block diagram of a control system of one embodiment of the present invention. The control system 100 includes a physical plant 10, feedback control 20, feedforward block 30, control entity 40, and a command generator system 50. Other embodiments of the invention may not necessary include feedback 20 and feedforward elements 30.

For the embodiment represented in FIG. 1A, unwanted vibration in the mechanical system of the physical plant 10 may be treated by various methods. The physical plant 10 can be modified to make it less flexible, or the feedback control 20 can be tuned to damp out vibration. The feedforward block 30 can be used to inject control effort into the loop, so as to negate vibration. The fourth option is the command generator system 50.

The desired motion command D(t) of the mechanical system of the physical plant 10 is fed into the command generator system 50 that transforms the desired motion command D(t) into a reference command r(t). If the reference commands have an appropriate shape, then they will produce the desired motion, while reducing the detrimental effects of flexibility.

Figure 1B:
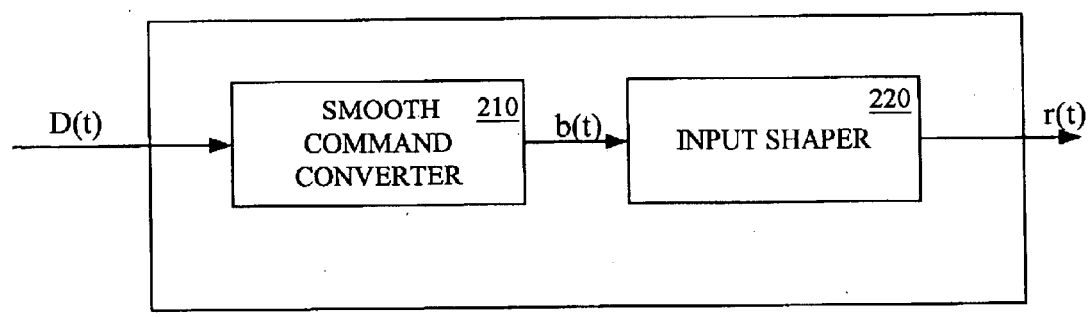
FIG. 1B is a block diagram of one embodiment of the command generator system shown in FIG. 1A.

For one preferred embodiment of the invention, as shown in FIG. 11B, the command generator system 50 generates a fast-rising input command that suppresses low modes while ensuring unmodeled high modes do not degrade the system performance. This is achieved by convolving a fast-rising smooth command profile as a baseline function 210 with an input shaper 220 to take advantages of the respective properties of each. Stated differently, input shaping is used for vibration suppression at the low frequencies and command smoothing for noise suppression at high frequencies. The roll-off frequency of the command smoothing is set near the onset of the high frequency dynamics. Therefore, the command smoothing does not cause a large time lag in the system. As shown in FIG. 1B, the desired motion command D(t) is converted to a baseline reference command b(t) via the smooth command converter 210 and then filtered by the input shaper 220 to produce the reference command r(t).

Figure 2A:
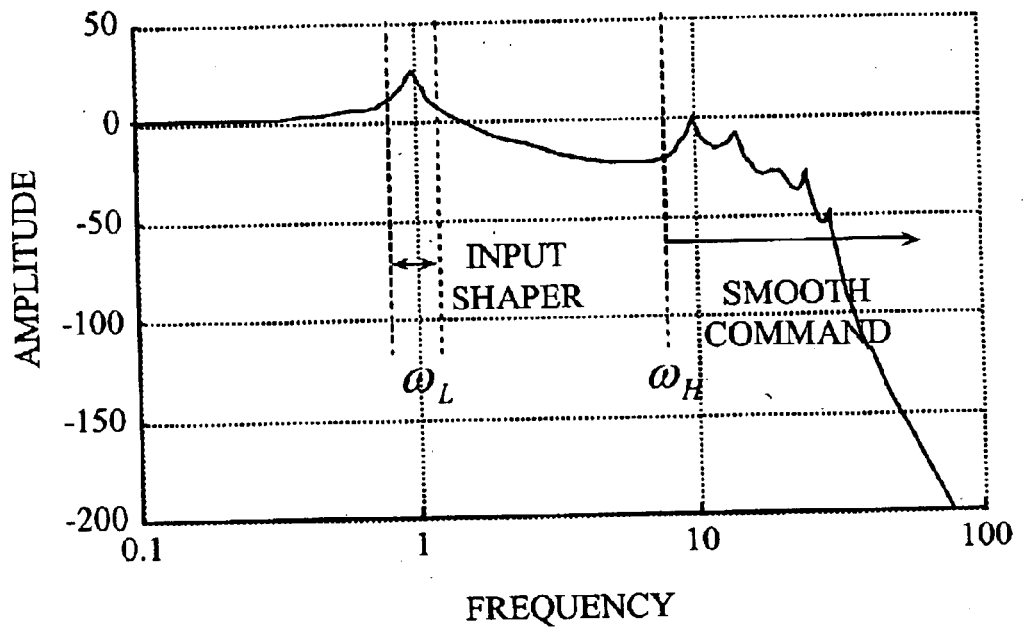
FIG. 2A is a graph of an example frequency spectrum for a system targeted by the command generator system of FIG. 1B.
Figure 2B:
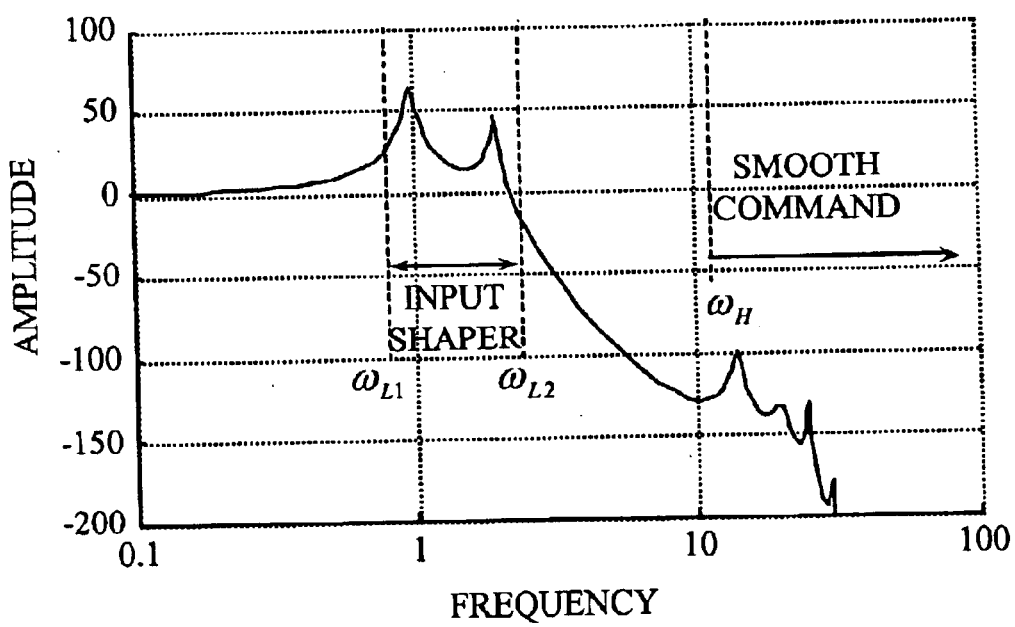
FIG. 2B is a graph of an example frequency spectrum for a system targeted by the command generator system of FIG. 1B.

Shown in FIG. 2A are possible frequency spans that each component of the command generator system 50 suppresses for a preferred embodiment. As shown in FIG. 2A, for a targeted mechanical system of a physical plant 10, there is residual vibration occurring at a low. frequency or mode, or a couple of low frequencies. Then, there is a gap with no significant vibration modes. This gap is followed by high frequencies or modes that do experience residual vibrations. The narrow frequency range around $\omega_L$ is dealt with by the input shaper (e.g., zero vibration (ZV) shaper) while any high modes starting at $\omega_H$ are attenuated by the smooth profile (e.g., S-curve). FIG. 2B shows a similar case where there are two low frequencies. Accordingly, the command generator system 50 suppresses vibration where there are a few low frequencies and a group of high frequencies. For example, disk drives are of this type of system, along with satellites and many types of manufacturing machines that have fairly complicated dynamics.

The main attribute of most smooth profiles is their low-pass filtering characteristic which can minimize residual vibrations at high frequencies. Common smooth command profiles include S-curves, versines, trigonometric transition functions, and cam polynomials. These smooth profiles rely on their smoothness to minimize the excitation of the flexible modes. Generally, only the command rise time of the smooth commands can be adjusted to significantly affect the frequency suppression. These methods by themselves usually fail to fully exploit the known properties of the system such as natural frequency and damping ratio and instead simply provide a low pass filtering effect.

With a command generator 50 that produces fast-rising low-pass filtering reference commands r(t), low modes in physical plant 10 will be suppressed while simultaneously unmodeled high modes are ensured to not degrade the system positioning. This overcomes the typical drawback to S-curves and other smooth commands regarding their slow rise times. By combining a fast rising S-curve with an input shaper, a reference command r(t) is produced that minimizes low and high frequency vibrations in a short amount of time. For example, the rise time penalty of a ZV-shaped-S-curve command produced by one embodiment of the invention compared to a conventional ZV input shaper is really small and yet, the performance of the system 10 is significantly better, since a ZV-shaper does not attenuate high frequencies when present.

Note, mechanical systems of a physical plant 10, especially flexible systems, may have a large, possibly infinite number of modes. For modeling reasons, this number is often reduced to a few dominant low modes and some range of higher modes. Because the time required to cancel vibrations is very dependent on the lower modes of a system, it is useful to relate the command rise time to the mode ratios before selecting a reference command r(t).

Figure 3:
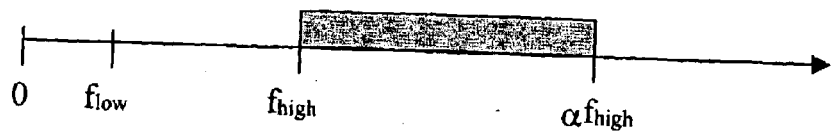
FIG. 3 is a graph of an example frequency span of the residual vibrations that are targeted by the command generator system of FIG. 1B.
Figure 4:
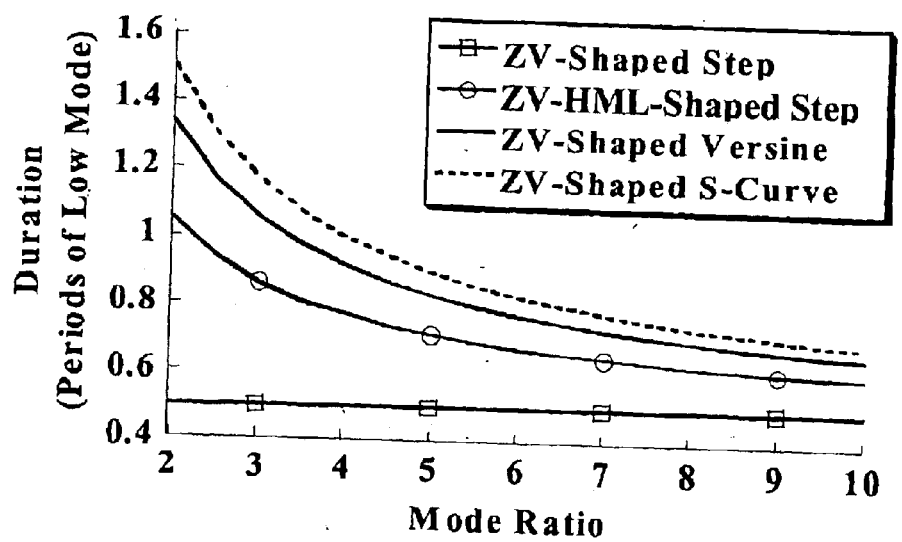
FIG. 4 is a graph of the command rise times produced by the command generator system of FIG. 1B for commands shaped with positive input shapers.

Accordingly, FIG. 3 shows the frequency span for a system with a single low mode, $f_{low}$, and high modes ranging from $f_{high}$ to $\alpha f_{high}$, $\alpha>1$, where $\alpha$ specifies the span of high frequencies that a control system must suppress. However, the most important parameter for choosing the reference command r(t) is the ratio of the lowest high mode frequency divided by the low mode frequency ($f_{high}/f_{low}$). As this mode ratio increases, the rise time gap between shaped-smooth commands and input-shaped commands diminishes. This effect can be observed in FIG. 4 for a sample system having a 1-Hz low mode and high mode vibrations in the frequency range from r, the mode ratio, to $\alpha r$, where $\alpha$ is 3 in this case. The figure compares the command rise times of the ZV-shaped S-curve, the ZV-shaped versine, and the ZV-HML shaped step. In the instance of a mode ratio of 10, the ZV-shaped S-curve and the ZV-shaped versine are only 10 and 15% longer than the ZV-HML-shaped step input.

Figure 5:
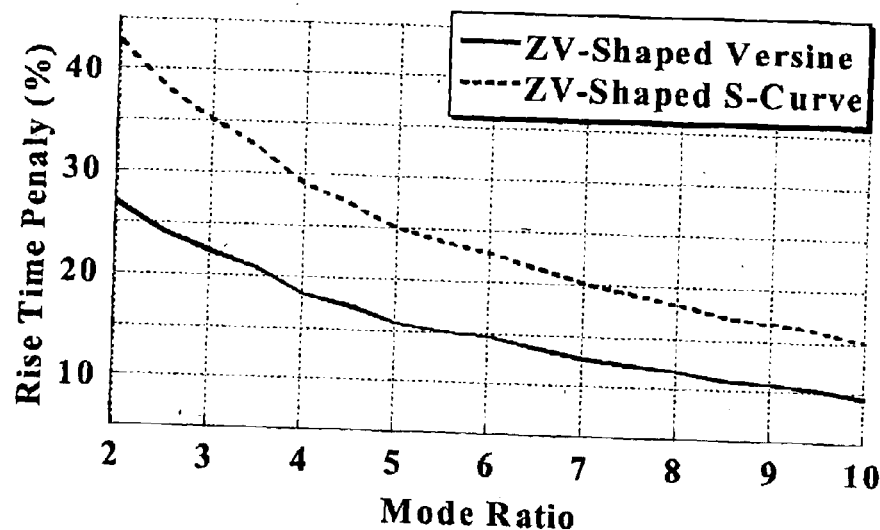
FIG. 5 is a graph of rise time penalties generated by the command generator of FIG. 11B for commands shaped with positive input shapers.

FIG. 5 offers another valuable rise time comparison as it shows the rise time penalty of the ZV-shaped smooth commands that may be generated by the command generator 50 over step inputs convolved with a ZV-HML shaper for the sample system. As mentioned above, for a mode ratio of 10, the ZV-shaped S-curve and the ZV-shaped versine are only 10 and 15% longer than the ZV-HML-shaped step input. For a mode ratio of 2, however, the penalty is more than doubled.

Figure 6:
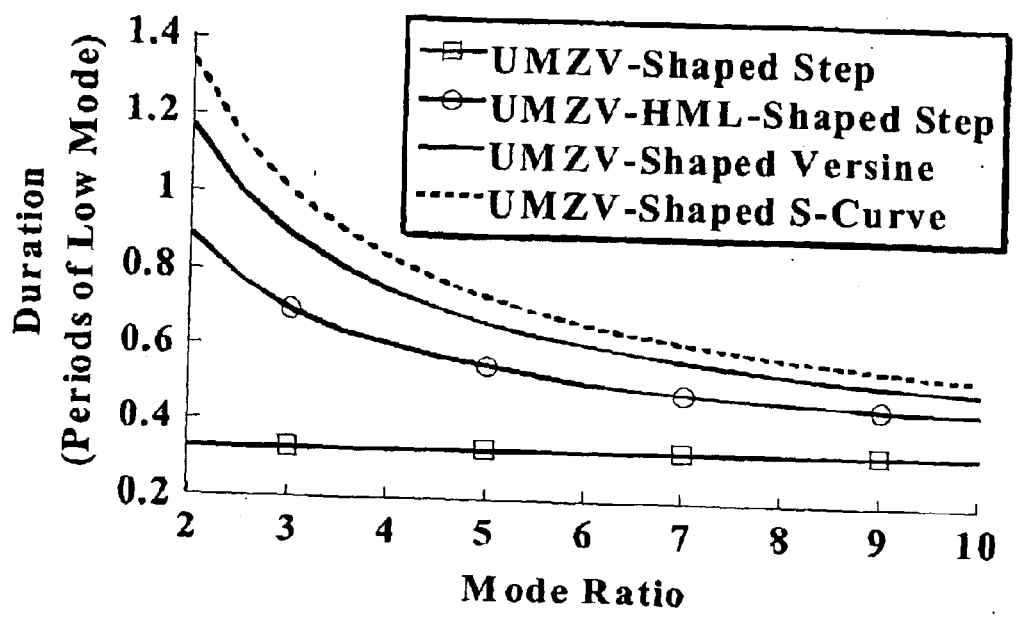
FIG. 6 is a graph of the command rise times produced by the command generator of FIG. 1B for commands shaped with negative input shapers.
Figure 7:
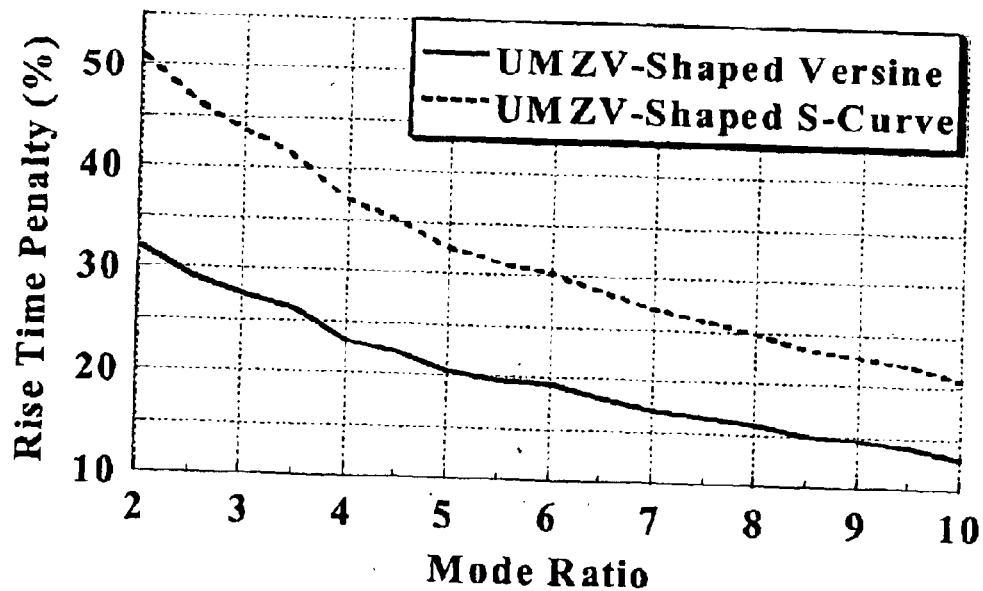
FIG. 7 is a graph of rise time penalties generated by the command generator of FIG. 11B for commands shaped with negative input shapers.

The same trends can be observed with negative input shapers, as demonstrated in FIGS. 6 and 7. But, in this case, utilizing input-shaped smooth commands (UMZV-Shaped S-Curve and UMZV-Shaped Versine) over HML-shaped step commands (UMZV-Shaped step input) is slightly more costly relative to the positive impulse case.

The rise time drawback of shaped-smooth commands may be of little cost in regard to some advantages from using shaped-smooth commands. One potential benefit is that no optimization is needed to shape smooth profiles with single-mode or simple two-mode shapers. Furthermore, the duration of UMZV and ZV-HML step inputs may have to be lengthened due to hardware limitations. Indeed it sometimes happens that the hardware sampling rate is not high enough to accurately convolve any command with a ZV-HML shaper. The remedy is then to generate an optimization to locate the impulses at multiple integers of the sampling period, hence possibly increasing the shaper duration slightly.

Figure 8:
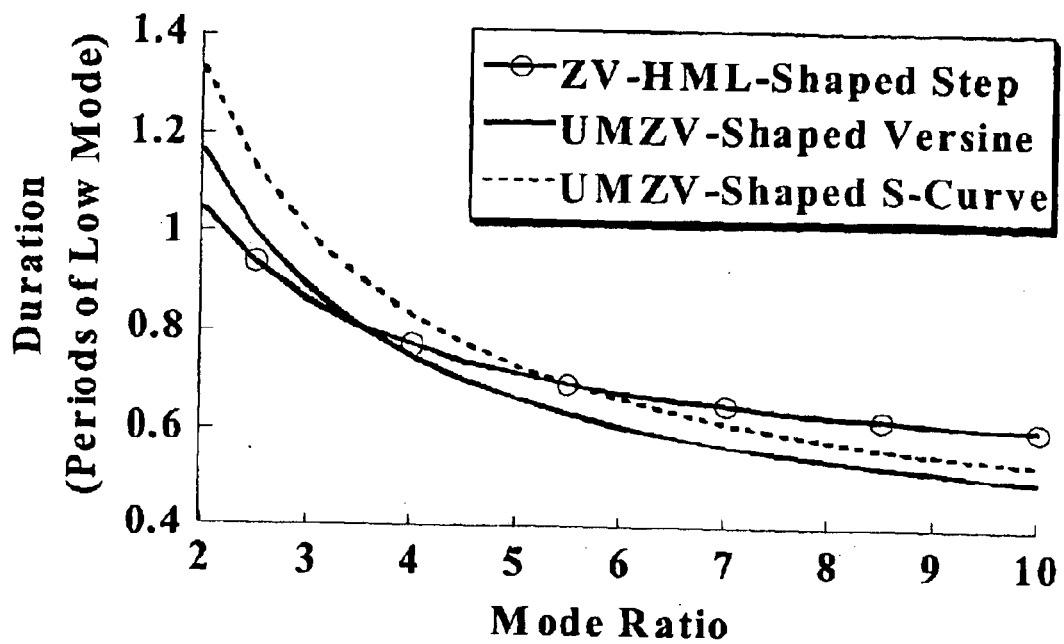
FIG. 8 is a graph of the command rise times produced by the command generator of FIG. 1B for negative shaped-smooth commands versus a positive shaped step command.
Figure 9:
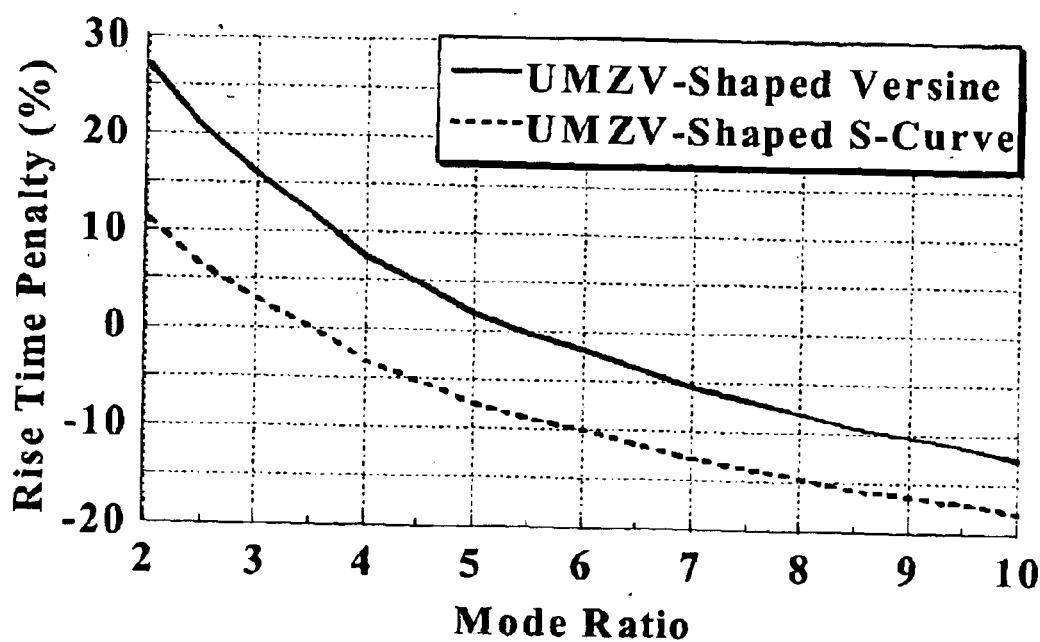
FIG. 9 is a graph of rise time penalties generated by the command generator of FIG. 1B for negative shaped-smooth commands in relation to a positive shaped step command.

Due to their low-pass filtering properties, smooth commands do not excite potential unmodeled high modes beyond $\alpha f_{high}$, even when combined with negative shapers. Thus by pairing smooth commands with negative input shapers, for example, unmodeled high modes beyond $\alpha f_{high}$ are not excited. In other words, for systems with unmodeled high modes, the duration of ZV-HML shapers can be preferably compared against the rise time UMZV-shaped smooth commands. FIG. 8 shows that above mode ratios of 3.5 and 5 respectively, the UMZV-shaped versine and S-curve (as utilized in some preferred embodiments) become shorter than the ZV-HML shaper. Even for low mode ratios, their time penalty is not overly large as demonstrated in FIG. 9.

The overall operation 1000 of the control system 100 will be now described with reference to FIG. 10, which depicts the functionality of a preferred implementation of the control system 100. First, in step 1010, important characteristics of the mechanical system (physical plant 10) are identified, such as the modes of vibration for the mechanical system, and damping ratios, for example. Then, as shown in step 1020, a steep (fast-rising) smooth baseline reference command b(t) is generated from the desired motion command D(t). The shape of the smooth baseline reference command b(t) is designed to have a short rise time in order to only suppress high frequency vibrations. Next in step 1030, based upon the characteristics of the mechanical system 10, the baseline reference command b(t) is convolved with an input shaper (impulse sequence) to produce a reference command r(t) for the mechanical system. The reference command r(t) is then delivered to the mechanical system, as shown in step 1040.

Figure 11:
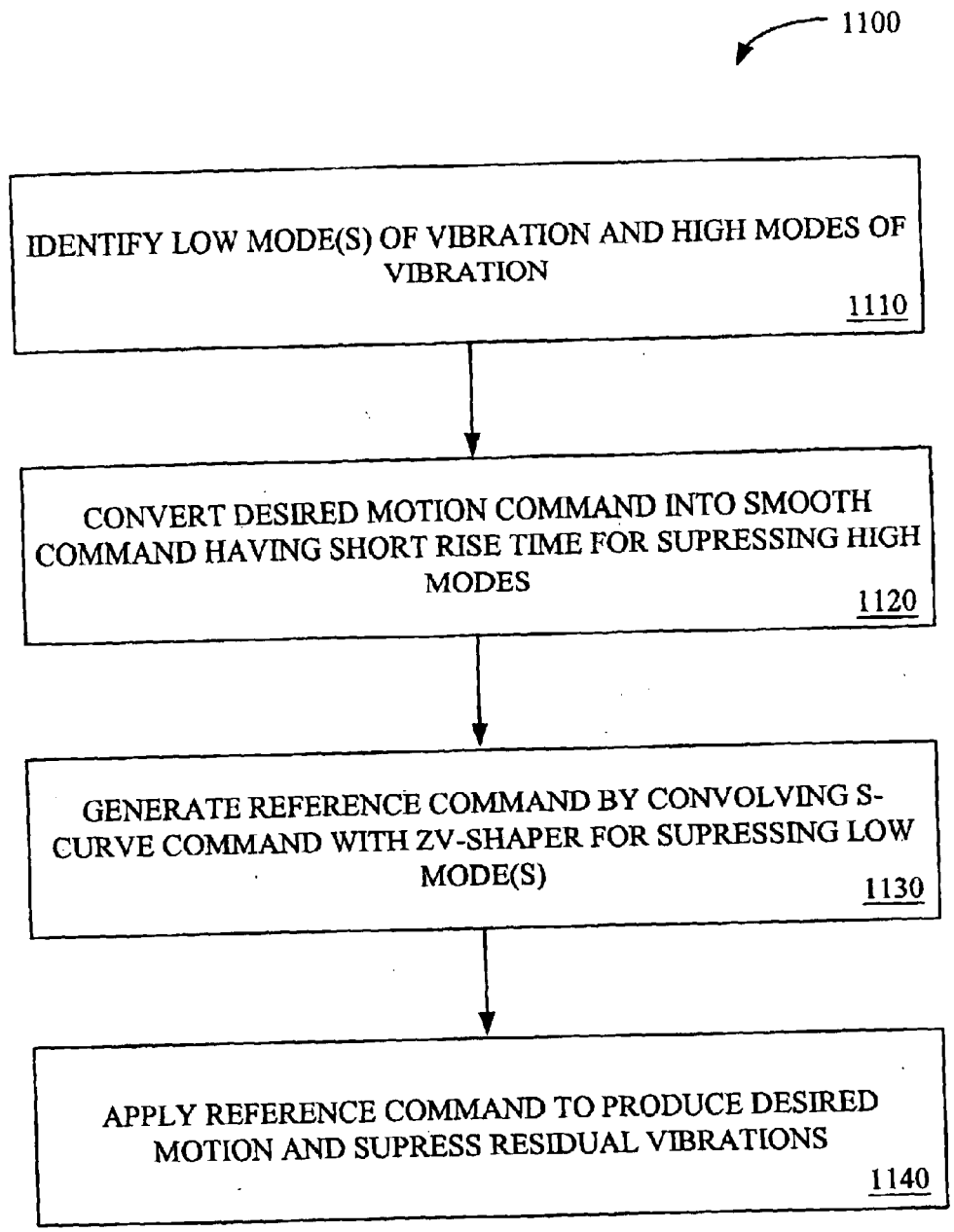
FIG. 11 is a flow chart describing the functionality of a preferred implementation of the command generator system of FIG. 1B for minimizing unwanted dynamics occurring at a low mode and a range of high modes.

As previously discussed, one particular type of system that may be targeted by this process 1000 is one where there is a low frequency, or a couple of low frequencies, and some gap, and then a range of high frequency vibrations (as shown in FIG. 2A). One implementation 1100 of addressing this problem is shown in FIG. 11. Here, it is identified that the mechanical system 10 features a low mode of vibration and range of vibrations in a high frequency range, as shown in step 1110. The desired motion command D(t) for the system is then converted into a smooth command, such as a S-curve command, b(t) that has a short rise time and is designed to suppress high frequency vibrations above the lower end of the high mode range, as shown in step 1120. The S-curve command b(t) is then convolved with a ZV shaper (that is designed to remove vibration at low modes) to produce the reference command r(t) of the mechanical system of the physical plant 10, as represented in step 1130. From the ZV shaper filtering, reference command r(t), once applied, eliminates the vibrations at the low mode of vibration and from the S-Curve conversion, reference command r(t) removes high frequency vibrations, as shown in step 1140.

Figure 12:
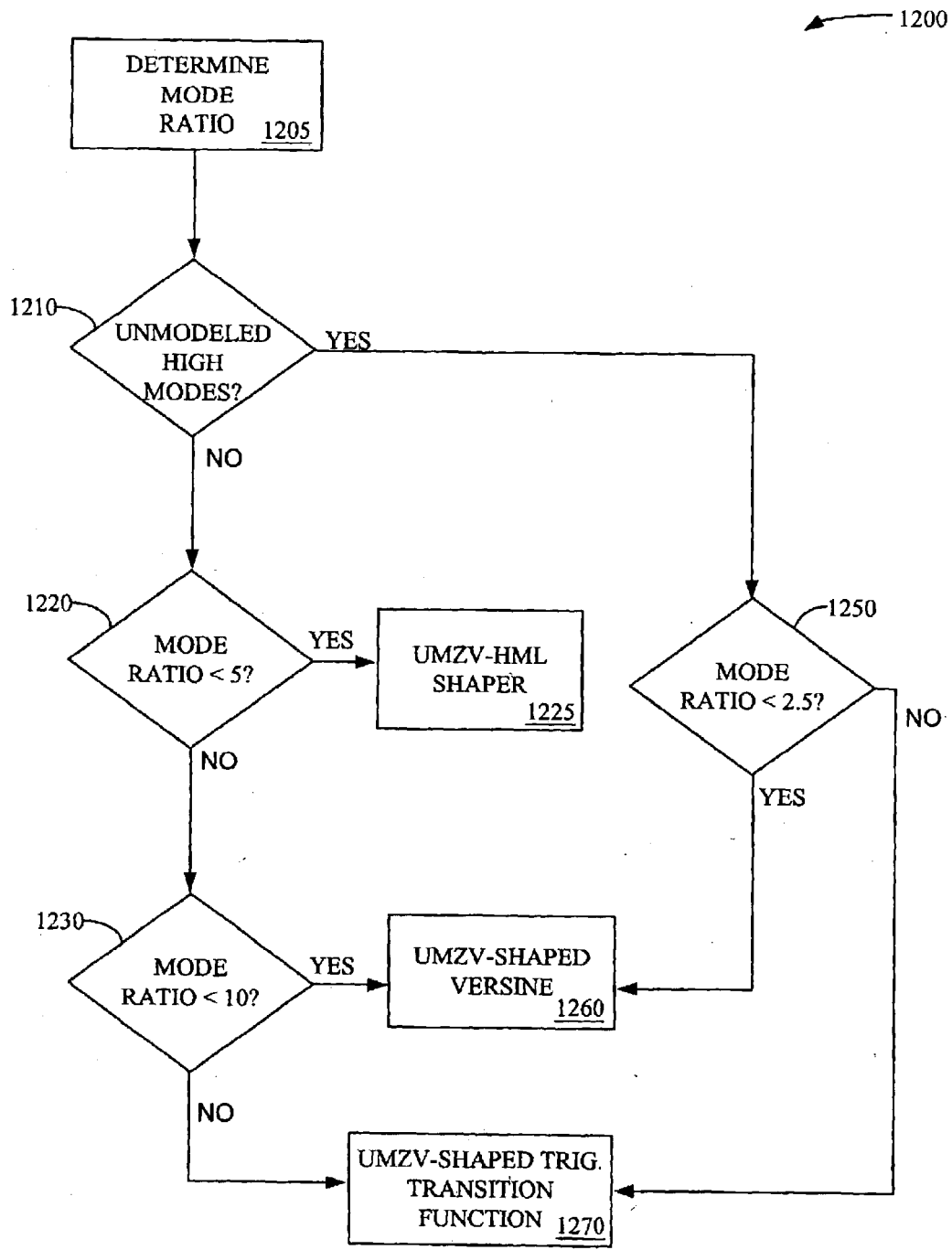
FIG. 12 is a flow chart describing one embodiment of a method for selecting a shaped-smooth command generated by the command generator of FIG. 1B.

FIGS. 5–9 demonstrate that the process 1000 of using smooth command shaping is preferable for a system having high modes that are significantly higher than the low mode. Yet, in some other instances, choosing between ZV-shaped S-Curves and ZV-HML-shaped step inputs, for example, may be less obvious, since the choice depends on factors such as the various modes of the system, the uncertainty on the high modes, etc. Accordingly, a method 1200 for selecting the appropriate shaped-smooth command for one embodiment of the invention is shown in FIG. 12.

The method 1200 accounts for the command rise time, the possibility of unmodeled high modes, and the complexity of generating the-shaped-smooth command. As such, the following rules apply to the method shown in FIG. 12:

1) In the event of expected unmodeled high modes, only positive input shapers are used on step inputs, as negative input shapers may excite those modes.

Figure 13:
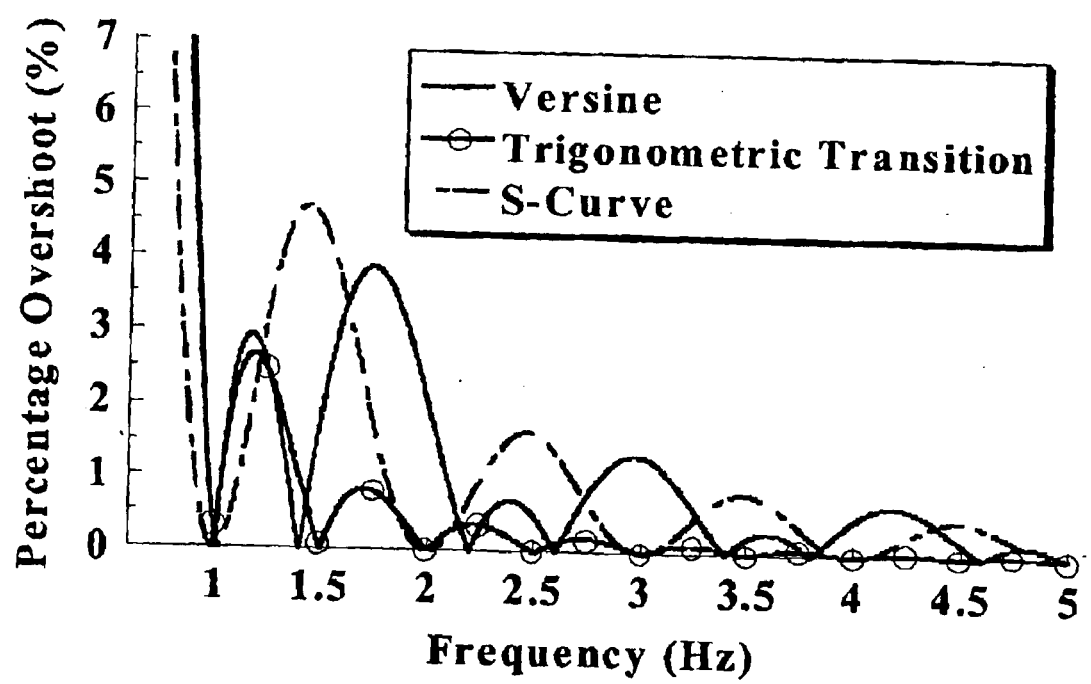
FIG. 13 is a graph of overshoot vs. system frequency for various smooth commands that may be utilized by the command generator of FIG. 1B.

2) For smooth commands with equal rise times, the most efficient low pass filter is used. This statement is motivated by the fact that all smooth commands do not attenuate vibration by the same amount, past the rolloff frequency as observed in FIG. 13. For instance, with the same rise time, trigonometric transition functions are more effective low pass filters than S-curves.

3) As HML-shaped step inputs can be shorter than shaped-smooth command, the user must also decide whether HML input shapers are worth the optimization effort or not. Although this decision will vary from user to user, it is considered that a smooth command rise time penalty of 20% is acceptable given the simplicity of generating smooth profiles.

Taking the above into account, the first step 1205 of FIG. 12 is identifying the mode ratio (or gap) between the low frequency dynamics and the high frequency dynamics of the mechanical system 10 of interest. Then, it is determined whether the mechanical system of the physical plant 10 has unmodeled high frequencies, as shown in step 1210. If there are none, then a traditional input shaping command, such as a UMZV-HML Shaper, is used for a mode ratio that is less than 5, as shown in steps 1220–1225. If the mode ratio is greater than 5 and less than 10 then a UMZV-Shaped Versine command is used, as shown in steps 1230 and 1260. Else, if the mode ratio is greater than 10, a UMZV-Shaped Trigonometric Transition Function is used, as shown in step 1270.

On the other hand, if it is determined that there are unmodeled high frequencies and the mode ratio is less than 2.5, the appropriate shaped-smooth reference command is a UMZV-Shaped Versine signal, as shown in steps 1210, 1250, and 1260. Otherwise, if there are unmodeled high frequencies and the mode ratio is greater than 2.5, then an appropriate shaped-smooth reference command for this implementation of the invention is a UMZV-Shaped Trigonometric Function, as shown in steps 1250 and 1270.

Note, the utilization of UMZV input shapers with smooth commands having low pass filtering characteristics advantageously and beneficially reduces residual vibrations in systems with higher order modes. This is particularly preferential when actuator limits prevent the use of step or fast-rising ramp inputs in certain mechanical systems.

In alternative embodiments of the invention, other decision processes for systems with a low mode and a range of higher modes are possible besides those shown in FIG. 12. For example, the decision blocks 1220, 1230, 1250 based on mode ratio could contain different mode ratio values. However, the method shown in FIG. 12 should prove to be applicable to many of those systems.

The enhanced vibration suppressing capabilities of the above-described embodiments of the present invention advantageously demonstrates the effectiveness of intelligently combining input shaping and command smoothing to reduce residual vibrations on systems with low modes and a range of higher modes. The notch filtering properties of input shaping suppress the low modes individually while keeping the duration of the command as short as possible. Diversely, smooth commands, which are essentially low-pass filters, attenuate potential high-mode excitations. For such systems, the association of the two techniques is often a better choice over the selection of input shapers that suppress the low modes and limit the high modes below a tolerable level. Further, the computational demands of the above-described embodiments are relatively small as compared to other techniques.

The command generator 50 of a representative embodiment of the present invention can be implemented in hardware, software, firmware, or a combination thereof. In the. preferred embodiment(s), the command generator 50 is implemented in hardware with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In alternative embodiment(s), the command generator 50 is implemented in software or firmware that is stored in a memory and that is executed by a suitable instruction execution system.

The flow charts of FIGS. 10–12 show the functionality and operation of a possible implementation of the control system of the present invention. In this regard, each block represents a module, segment, or portion of code, which comprises one or more executable instructions for implementing the specified logical function(s). It should also be noted that in some alternative implementations, the functions noted in the blocks may occur out of the order noted in the figures. Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the principles of the invention. All such modifications and variations are intended to be included herein within the scope of this disclosure and the present invention and protected by the following claims.

Therefore, having thus described the invention, at least the following is claimed:

1. A system for controlling a physical system by generating an input to the physical system that does not excite unwanted dynamics comprising:

a command generator responsive to a motion command to generate a shaped-smooth command as input to the physical system for controlling the physical system while suppressing unwanted dynamics in the physical system, wherein the shaped-smooth command is formed by combining a smooth command profile with an input shaper, the shaped-smooth command suppressing unwanted dynamics within the physical system, the unwanted dynamics including at least one low mode and at least one high mode.

2. The system of claim 1, further comprising:
a moveable structure within the physical system; and
a control device functionally connected to the moveable structure and operable to generate the motion command for directing a desired movement of the moveable structure.

3. The system of claim 1, wherein the unwanted dynamics include residual vibrations occurring at at least one low mode and a range of high modes.

4. The system of claim 1, the command generator further comprising:
an apparatus for converting the motion command to a smooth baseline reference command;
an apparatus for convolving the smooth baseline reference command with a particular impulse sequence to produce the shaped-smooth command.

5. The system of claim 4, wherein the smooth baseline reference command is designed to have a short rise time to minimize unwanted dynamics at a range of high modes and not at low modes.

6. The system of claim 4, wherein the particular impulse sequence is designed to remove unwanted dynamics at a particular low mode based upon characteristics of the physical system.

7. The system of claim 4, wherein the particular impulse sequence is designed to remove unwanted dynamics at a plurality of particular low modes based upon characteristics of the physical system.

8. The system of claim 4, wherein the smooth baseline reference command comprises a S-curve profile.

9. The system of claim 4, wherein the particular impulse sequence contains negative impulses.

10. The system of claim 1, wherein the command generator generates a particular shaped-smooth command based upon a particular mode ratio of unwanted dynamics.

11. The system of claim 1, wherein the command generator suppresses the unwanted dynamics below a predefined level.

12. A system for controlling a physical system by generating an input to the physical system that does not excite unwanted dynamics comprising:
means for generating a motion command for the physical system; and
means for generating a shaped-smooth command as input to the physical system from the motion command that suppresses unwanted dynamics in the physical system, wherein the shaped-smooth command is formed by combining a smooth command profile with an input shaper, the shaped-smooth command suppressing unwanted dynamics within the physical system, the unwanted dynamics including at least one low mode and at least one high mode.

13. The system of claim 12, the means for generating a shaped-smooth command comprising:
means for converting the motion command to a smooth command; and
means for convolving the smooth command with an impulse sequence to produce the shaped-smooth command.

14. The system of claim 12, further comprising:
means for identifying a mode ratio of unwanted dynamics in the physical system, wherein the motion command is converted to a particular shaped-smooth command based upon the mode ratio.

15. A method for controlling a physical system by generating an input to the physical system that does not excite unwanted dynamics comprising:
receiving a motion command for the physical system; and
generating a shaped-smooth command as input to the physical system from the motion command that suppresses unwanted dynamics in the physical system, wherein the shaped-smooth command is formed by combining a smooth command profile with an input shaper, the shaped-smooth command suppressing unwanted dynamics within the physical system, the unwanted dynamics including at least one low mode and at least one high mode.

16. The method of claim 15, the generating step comprising:
identifying important characteristics about the unwanted dynamics of the physical system; and
designing the shaped-smooth command based upon these important characteristics.

17. The method of claim 16, wherein the important characteristics include a low mode of residual vibration and a high mode range of residual vibration.

18. The method of claim 16, wherein the important characteristics include a plurality of low modes of residual vibration and a high mode range of residual vibration.

19. The method of claim 16, wherein the important characteristics include a damping ratio.

20. The method of claim 16, wherein the important characteristics include a mode ratio of unwanted dynamics that determines a particular type of shaped-smooth command that is to be generated for a particular mode ratio.

21. The method of claim 15, the generating step comprising:
converting the motion command to a smooth command; and
convolving the smooth command with an impulse sequence to produce the shaped-smooth command.

22. The method of claim 21, wherein the smooth command is designed to have a short rise time to minimize unwanted dynamics at high modes and not at low modes.

23. The method of claim 21, wherein the smooth command comprises a curve profile.

24. The method of claim 21, wherein the impulse sequence contains negative impulses.

25. The method of claim 15, the generating step comprising:
identifying a mode ratio from the unwanted dynamics of the physical system; and
for a particular mode ratio, producing a particular shaped-smooth command that minimizes unwanted dynamics characterized by the particular mode ratio.

26. The method of claim 15, the generating step comprising:
identifying a mode ratio from the unwanted dynamics of the physical system;
generating a shaped step input command if the mode ratio is less than a mode ratio parameter; and
generating the shaped-smooth command if the mode ratio is more than the mode ratio parameter.

27. The method of claim 15, the generating step comprising:
identifying a mode ratio from the unwanted dynamics of the physical system;
generating a shaped step input command if the mode ratio is less than a first mode ratio parameter;
generating a first shaped-smooth command if the mode ratio is more than the first mode ratio parameter and less than a second mode ratio parameter; and generating a second shaped-smooth command if the mode ratio is more than the second mode ratio parameter.

28. The method of claim 15, wherein the unwanted dynamics are suppressed below a predefined level.

29. A computer readable medium having a computer program for controlling a physical system by generating an input to the physical system that does not excite unwanted dynamics, the program for performing the steps of:

receiving a motion command for the physical system; and generating a shaped-smooth command as input to the physical system from the motion command that suppresses unwanted dynamics in the physical system, wherein the shaped-smooth command is formed by combining a smooth command profile with an input shaper, the shaped-smooth command suppressing unwanted dynamics within the physical system, the unwanted dynamics including at least one low mode and at least one high mode.

30. The medium of claim 29, the generating step comprising:

identifying important characteristics about the unwanted dynamics of the physical system; and designing the shaped-smooth command based upon these important characteristics.

31. The medium of claim 29, the generating step comprising:

converting the motion command to a smooth command; and convolving the smooth command with an impulse sequence to produce the shaped-smooth command.

32. The medium of claim 29, the generating step comprising:

identifying a mode ratio from the unwanted dynamics of the physical system; and for a particular mode ratio, producing a particular shaped-smooth command that minimizes unwanted dynamics characterized by the particular mode ratio.

33. The medium of claim 29, the generating step comprising:

identifying a mode ratio from the unwanted dynamics of the physical system;

generating a shaped step input command if the mode ratio is less than a mode ratio parameter; and generating the shaped-smooth command if the mode ratio is more than the mode ratio parameter.

34. The medium of claim 29, the generating step further comprising:

identifying a mode ratio from the unwanted dynamics of the physical system;

generating a shaped step input command if the mode ratio is less than a first mode ratio parameter;

generating a first shaped-smooth command if the mode ratio is more than the first mode ratio parameter and less than a second mode ratio parameter; and generating a second shaped-smooth command if the mode ratio is more than the second mode ratio parameter.

* * * * *